(12) United States Patent
Cowie et al.

(10) Patent No.: US 6,341,936 B1
(45) Date of Patent: Jan. 29, 2002

(54) FOD INSPECTION OF LASER SHOCK PEENED GAS TURBINE ENGINE AIRFOILS

(75) Inventors: William D. Cowie, Xenia; Seetharamaiah Mannava, Cincinnati, both of OH (US); Jeffrey H. Nussbaum, Wilmington, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/556,713

(22) Filed: Apr. 21, 2000

(51) Int. Cl.[7] .................................................. F01D 5/14
(52) U.S. Cl. ...................... 415/1; 416/241 R; 29/889.1; 29/889.7
(58) Field of Search ............................ 29/889.1, 889.7, 29/402.01, 402.08; 416/1, 241 R, 223 A, 61; 415/200, 118

(56) References Cited

U.S. PATENT DOCUMENTS

| | | | |
|---|---|---|---|
| 4,608,756 A | | 9/1986 | Sharon |
| 4,639,991 A | | 2/1987 | Sharon ....................... 29/889.7 |
| 4,937,421 A | * | 6/1990 | Ortiz, Jr. et al. ......... 219/121.68 |
| 5,031,313 A | * | 7/1991 | Blair et al. ................. 29/889.1 |
| 5,197,191 A | | 3/1993 | Dunkman et al. .......... 29/889.1 |
| 5,281,062 A | | 1/1994 | Dunkman et al. ........... 409/179 |
| 5,492,447 A | * | 2/1996 | Mannava et al. ........... 415/200 |
| 5,531,570 A | * | 7/1996 | Mannava et al. ....... 416/241 R |
| 5,591,009 A | * | 1/1997 | Mannava et al. ....... 416/241 R |
| 5,644,394 A | | 7/1997 | Owens |
| 5,674,328 A | * | 10/1997 | Mannava et al. ........... 148/525 |
| 5,674,329 A | * | 10/1997 | Mannava et al. ........... 148/525 |
| 5,756,965 A | * | 5/1998 | Mannava ................ 219/121.85 |
| 5,954,464 A | | 9/1999 | Dansereau et al. |
| 6,173,491 B1 | * | 1/2001 | Goodwater et al. ......... 29/889.1 |
| 6,238,187 B1 | * | 5/2001 | Dulaney et al. ......... 416/241 R |
| 6,269,540 B1 | * | 8/2001 | Islam et al. ................. 29/889.7 |

OTHER PUBLICATIONS

GE Aircraft Engines, "CF6–80C2 Engine Manual", 72–31–01 Inspection pp. 802 and 811, Jul. 1, 1999.
GE Aircraft Engines, "CF6–80C2 Engine Manual", 72–31–02 Inspection pp. 802, 803 and 810, Jul.1, 1999.
GE Aircraft Engines, "CF6–80C2 Engine Manual", 72–32–02 Inspection pp. 802 and 803, Jul. 1, 1999.
GE Aircraft Engines, "CF6–80C2 Engine Manual", 72–31–03 Inspection pp. 819 and 830, Jul. 1, 1999.
GE Aircraft Engines, "Repair Engineering Instruction", REI No. F414–14093R4, pp. 1–18 of 65.

* cited by examiner

Primary Examiner—F. Daniel Lopez
Assistant Examiner—Richard Woo
(74) Attorney, Agent, or Firm—Andrew C. Hess; V. Ramaswamy (57) ABSTRACT

The present invention is a method for operating a gas turbine engine airfoil having leading and trailing edges subject to FOD (foreign object damage) damage. The method includes inspecting the airfoil along at least a first one of the edges having at least a first laser shock peened patch along the first one of the edges, ascertaining FOD lengths of foreign object damage (FOD) extending from the first one of the edges into the airfoil within the patch, and allowing the airfoil to remain in service without repair if the FOD lengths are up to a maximum length of about one-half of a width of the laser shock peened patch, as measured from the edge.

16 Claims, 7 Drawing Sheets

FOD INSPECTION OF LASER SHOCK PEENED GAS TURBINE ENGINE AIRFOILS

BACKGROUND OF THE INVENTION

1. Field of the Invention

This invention relates to operation of gas turbine engine laser shock peened airfoils and, more particularly, to extending tolerances of FOD damaged laser shock peened airfoils.

2. Discussion of the Background Art

Leading and trailing edges of aircraft gas turbine engine rotor blade airfoils are subject to wear and damage that forms gouges and cracks due to ingestion of material into the engine, this is often referred to as foreign object damage (FOD). The airfoil is also subject to vibrations generated during engine operation and the cracks due to FOD operate as high cycle fatigue stress risers producing additional stress concentrations around them. These cracks tend to grow and the airfoils must be periodically inspected. Conventionally, airfoils having cracks about 20–50 mils long (0.02–0.05 inches) or greater are repaired using a process known as blending. This allows the service life of the blade or vane to be extended saving the time and cost of replacing the part. Procedures and tools have been developed to accomplish this, see for example U.S. Pat. Nos. 5,197,191, 5,281,062, and 5,644,394. FOD inspection and blending repair procedures are typically distributed to aircraft gas turbine engine customers and repair shops. Inspection procedures, typically require visual inspection for cracks in the airfoil leading and trailing edges and have established crack length limits, typically measured from the edge inward and typically in the range of about 20–50 mils long. Blending is an expensive and time consuming process and, therefore, it is highly desirable to extend the service of blades and vanes having FOD damage that would otherwise be repaired with blending or scrapped. There are many reasons to extend the useful life of the airfoils and avoid such a repair procedure. With the advent of blade integral disks or BLISKs, there is an even greater need to avoid the blend repair of the leading and trailing edges of the blade airfoils because blisk blades cannot easily be disassembled or repaired and BLISK replacement is very expensive.

SUMMARY OF THE INVENTION

The present invention includes a method for operating a gas turbine engine airfoil having leading and trailing edges subject to FOD damage. The method includes inspecting the airfoil along at least a first one of the edges having at least a first laser shock peened patch along the first one of the edges, ascertaining FOD lengths of foreign object damage (FOD) extending from the first one of the edges into the airfoil within the patch, and allowing the airfoil to remain in service if the FOD lengths are up to a maximum length of about one-half a width of the laser shock peened patch as measured from the edge. In one embodiment, the width of the laser shock peened patch is in a range of about 0.50–1.50 inches. In another embodiment, the airfoil is allowed to remain in service if the maximum length is in a range of about 0.150–0.300 inches.

Yet another method of the present invention includes operating a gas turbine engine airfoil having leading and trailing edges subject to FOD damage and for which there is a first limit on length of foreign object damage (FOD) as measured from a first one of the edges of a corresponding non-laser shock peened airfoil. The method includes the following steps: A) inspecting at least a first one of the edges having at least one laser shock peened patch along the first one of the edges, B) ascertaining FOD lengths of foreign object damage (FOD) extending from the first one of the edges into the airfoil within the patch, and C) allowing the airfoil to remain in service if the ascertained FOD lengths from step B) are up to about five to eight times the first limit on length of foreign object damage as measured from the leading edge.

Another method includes laser shock peening the leading edge and forming pressure and suction side laser shock peened patches on pressure and suction sides, respectively, of the airfoil along the leading edge such that the laser shock peened patches extend along substantially an entire spanwise length of the leading edge. Then operating the gas turbine engine airfoil in service, inspecting the airfoil, ascertaining FOD lengths of foreign object damage (FOD) extending from the leading edge into the patches, and allowing the airfoil to remain in service if the FOD lengths are up to about one-half a width of the laser shock peened patches as measured from the leading edge. One more particular method of the invention includes laser shock peening using dual laser beams fired simultaneously with each of the laser beams having a power in a range of about 40–60 joules and forming laser beam spots with a diameter of about ¼ inch at a surface of the patch. In one more particular embodiment, each of the laser beams having a power of about 50 joules and in another 40 joules.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
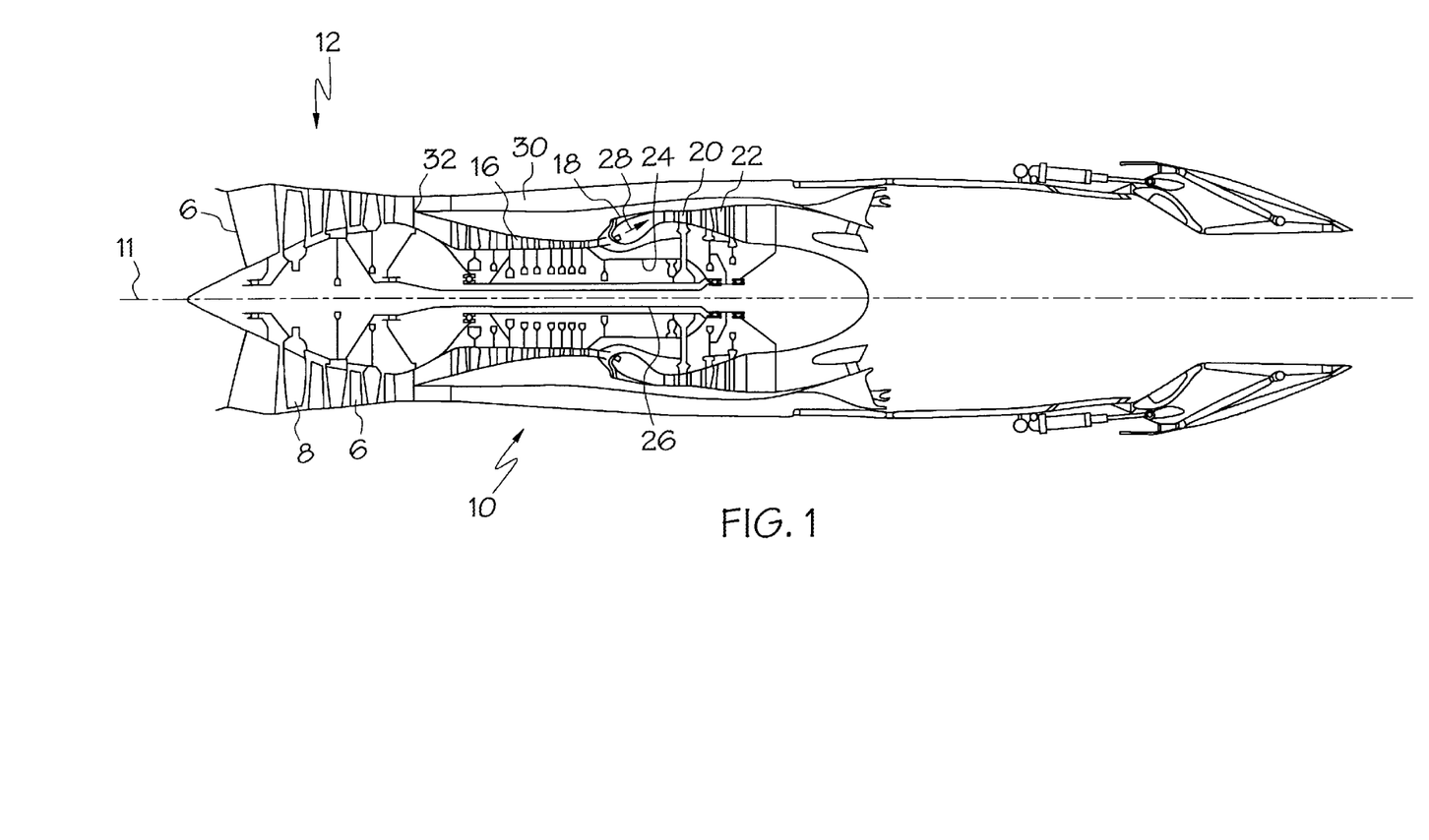
FIG. 1 is a cross-sectional illustrative view of an exemplary aircraft gas turbine engine having airfoils that are laser shock peened and inspected in an exemplary embodiment of the present invention.

Illustrated in FIG. 1 is a schematic representation of an exemplary aircraft turbofan gas turbine engine 10 including fan vanes 6 and fan blades 8 illustrating an exemplary embodiment of the present invention. The gas turbine engine 10 is circumferentially disposed about an engine centerline 11 and has, in serial flow relationship, a fan section 12, a high pressure compressor 16, a combustion section 18, a high pressure turbine 20, and a low pressure turbine 22. The combustion section 18, high pressure turbine 20, and low pressure turbine 22 are often referred to as the hot section of the engine 10. A high pressure rotor shaft 24 connects, in driving relationship, the high pressure turbine 20 to the high pressure compressor 16 and a low pressure rotor shaft 26 drivingly connects the low pressure turbine 22 to the fan section 12. Fuel is burned in the combustion section 18 producing a very hot gas flow 28 which is directed through the high pressure and low pressure turbines 20 and 22, respectively, to power the engine 10. A portion of the air passing through the fan section 12 is bypassed around the high pressure compressor 16 and the hot section through a bypass duct 30 having an entrance or splitter 32 between the fan section 12 and the high pressure compressor 16. Many engines have a low pressure compressor (not shown) mounted on the low pressure rotor shaft 26 between the splitter 32 and the high pressure compressor 16. Blades and vanes having airfoils are used in the fan, compressor, and turbine sections of the engine and the present invention can potentially be applied to airfoils of all blades and vanes.

Figure 2:
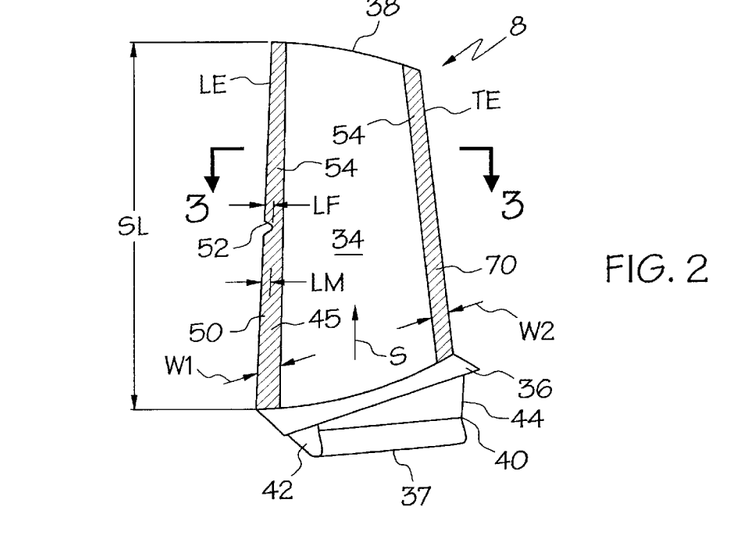
FIG. 2 is a perspective illustrative view of an exemplary aircraft gas turbine engine fan blade in FIG. 1 having an airfoil including a laser shock peened radially extending leading edge.
Figure 3:
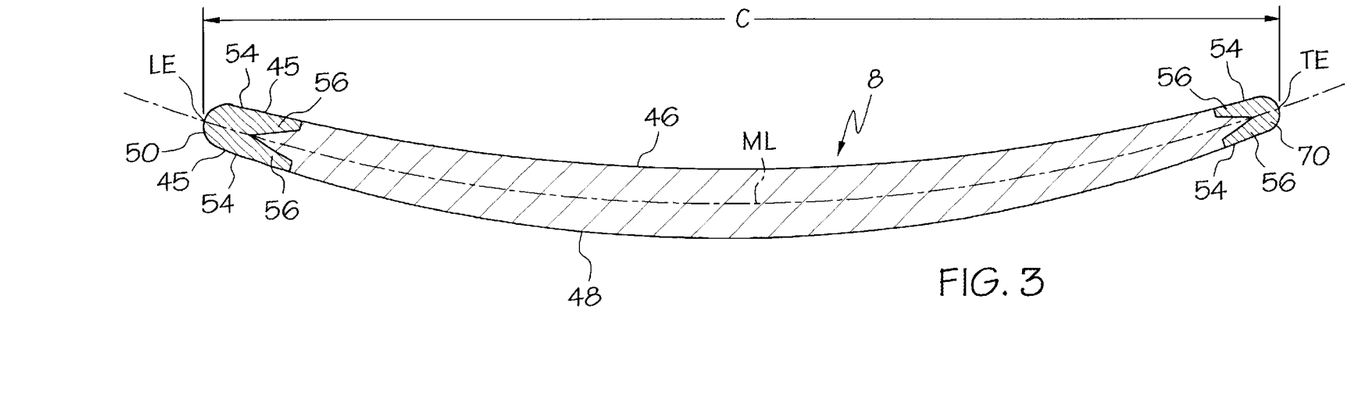
FIG. 3 is a cross-sectional view through the fan blade taken along line 3—3 as illustrated in FIG. 2.

Referring to FIGS. 2 and 3, the fan blade 8 includes an airfoil 34 extending radially outward in a spanwise direction S from an airfoil base 35 on a blade platform 36 to an airfoil or blade tip 38. The fan blade 8 includes a root section 40 extending radially inward from the platform 36 to a radially inward end 37 of the root section 40. At the radially inward end 37 of the root section 40 is a blade root 42 which is connected to the platform 36 by a blade shank 44. The airfoil 34 extends in the chordwise direction between a leading edge LE and a trailing edge TE of the airfoil. A chord C of the airfoil 34 is the line between the leading edge LE and trailing edge TE at each cross-section of the blade as illustrated in FIG. 3. A pressure side 46 of the airfoil 34 faces in the general direction of rotation as indicated by the arrow and a suction side 48 is on the other side of the airfoil and a mean-line ML is generally disposed midway between the two faces in the chordwise direction.

Referring again to FIG. 2, fan blade 8 has a leading edge section 50 that extends along the leading edge LE of the airfoil 34 from the blade platform 36 to the blade tip 38. The leading edge section 50 includes a predetermined first width W1 such that the leading edge section 50 encompasses nicks 52 or cracks and tears that may occur along the leading edge of the airfoil 34 also known as foreign object damage (FOD). The airfoil 34 is subject to a significant tensile stress field due to centrifugal forces generated by the fan blade 8 rotating during engine operation. The airfoil 34 is also subject to vibrations generated during engine operation and crack growth of the FOD which operates as high cycle fatigue stress risers producing additional stress concentrations around them.

These cracks tend to grow and the airfoils must be periodically inspected. Conventionally, airfoils having cracks about 20–50 mils long (0.02–0.05 inches) or greater are repaired using a process known as blending. This allows the service life of the blade or vane to be extended saving the time and cost of replacing the part. Procedures and tools have been developed to accomplish this, see for example U.S. Pat. Nos. 5,197,191, 5,281,062, and 5,644,394. FOD inspection and blending repair procedures are typically distributed to aircraft gas turbine engine customers and repair shops. Blending is typically allowed for cracks and the FOD damage extending up to about 20 mils. Blending is an expensive and time consuming process and, therefore, it is highly desirable to extend the service of blades and vanes having FOD damage that would otherwise be repaired with blending or scrapped.

To counter fatigue failure of portions of the blade along possible crack lines that can develop and emanate from the nicks and tears at least one and preferably both of the pressure side 46 and the suction side 48 have at least one laser shock peened patch 45 with a laser shock peened surface 54 and a pre-stressed region 56 having deep compressive residual stresses imparted by laser shock peening (LSP) extending into the airfoil 34 from the laser shock peened surface as seen in FIG. 3. The airfoil 34 preferably has two laser shock peened patches 45, one on each of the pressure and suction sides 46 and 48, respectively, with two corresponding laser shock peened surfaces 54 along the leading edge LE. The pre-stressed regions 56 and patches 45 are illustrated as being co-extensive with the leading edge section 50 in the chordwise direction to the full extent of width W1 and are deep enough into the airfoil 34 to coalesce for at least a part of the width W1. The pre-stressed regions 56 are shown co-extensive with the leading edge section 50 in the radial direction along substantially an entire spanwise length SL of the leading edge LE but may be shorter.

Figure 4:
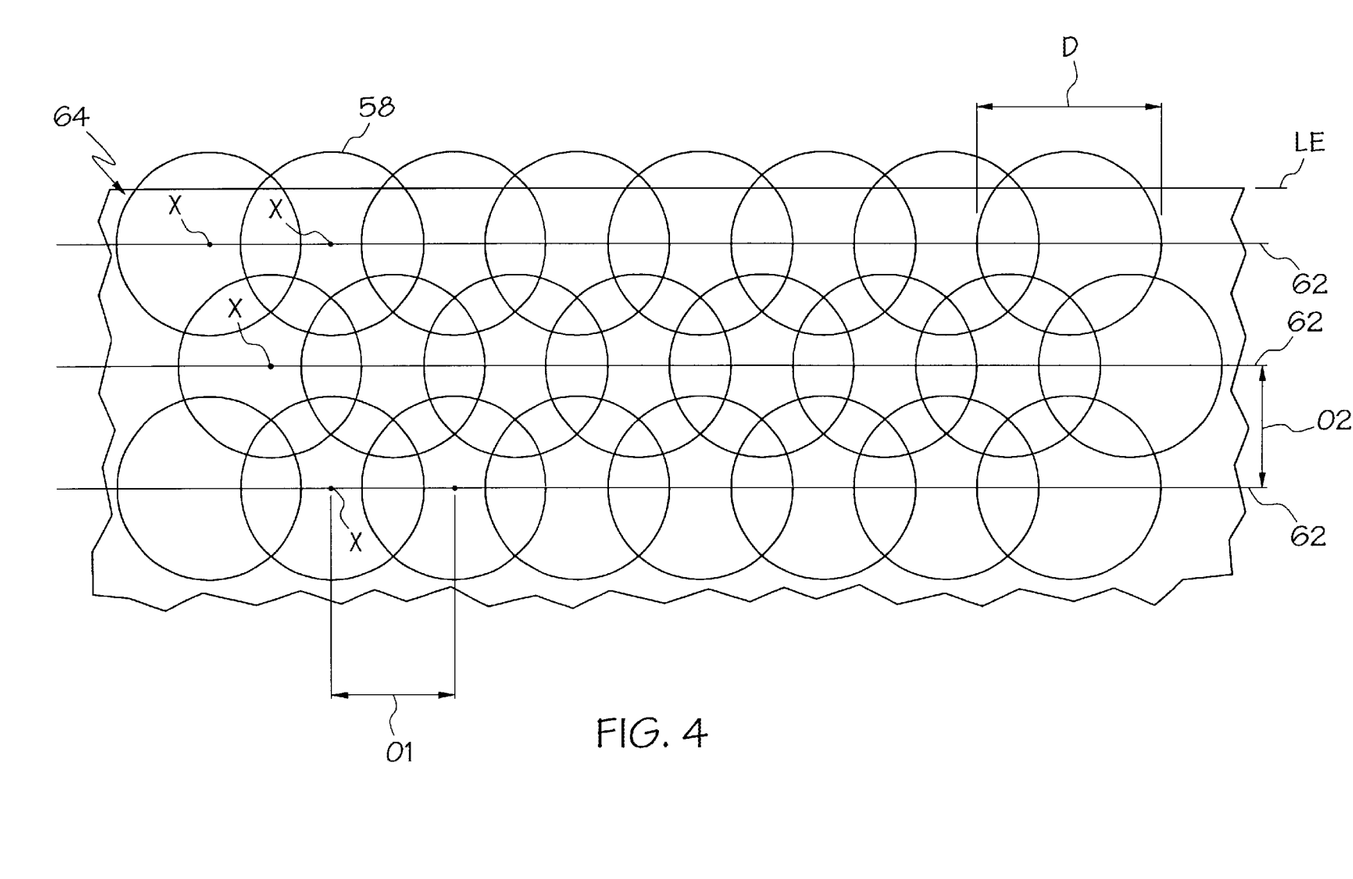
FIG. 4 is an enlarged view of the laser shock peened leading edge illustrated in FIG. 2.
Figure 7:
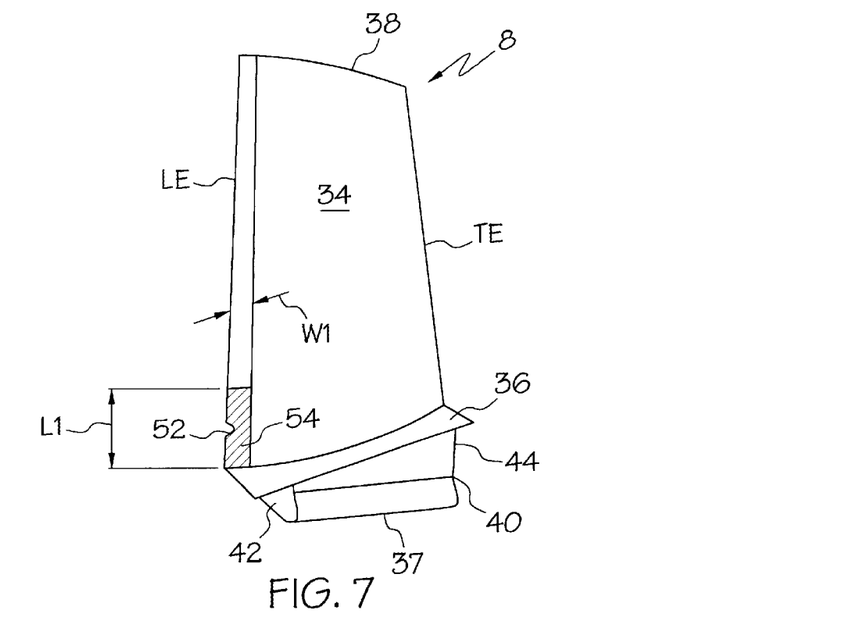
FIG. 7 is a perspective illustrative view of another exemplary aircraft gas turbine engine fan blade in FIG. 1 having an airfoil including a laser shock peened patch extending radially along a part of the leading edge.

The laser shock peened surfaces 54 are formed by overlapping laser shocked peened circular spots 58. The invention may also be used for shorter patch lengths L1 of the laser shock peened patches as illustrated in FIG. 7. As examples of the present invention, fan blades having airfoils with a length of about 9 inches have been laser-shock peened and have patch lengths L1 of 3.1, 5.3, and 8.0 inches and patch widths W1 about 0.5 inches. The patches were formed using laser beams of about 48–50 joules and 40 joules with spots 58 having diameters D of about ¼ inch as illustrated in FIG. 4. A similar trailing edge section 70 with a second width W2 is also laser shock peened in the same manner in a more particular embodiment of the invention.

Figure 9:
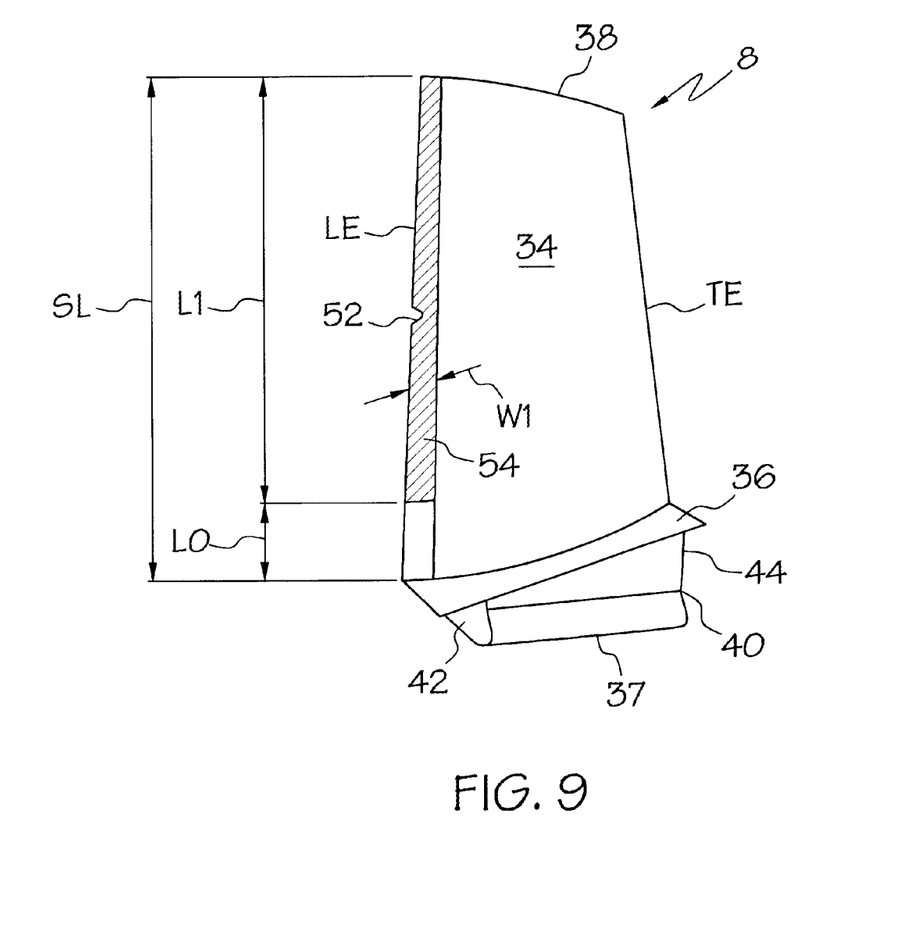
FIG. 9 illustrates another example of the present invention.

FIG. 9 illustrates another example of the present invention in the form of first stage HPC blades 8 of the high pressure compressor having airfoils 34 with spanwise lengths SL of about 2.5 inches and the chords C about 1.9 inches long. The airfoil leading edge LE was laser shock peened to form laser shock peened patches 45 offset an offset distance LO from the airfoil base 35 so as not to impart any compressive residual into the blade along an area where the airfoil meets the platform. There is typically a fillet in this area, where the airfoil meets the platform, which may contain tensile residual stresses and it is desirable to avoid imparting any compressive residual into this area. The laser shock peened patches 45 extend from the offset distance LO which is about 15% of the spanwise length SL and have patch lengths L1 that are about 85% of the spanwise length SL. The patch widths W1 are about 0.25 inches. The patches were formed using laser beams of about 40–50 joules with spots 58 having diameters D of about 0.16 inches or 4 mm. In another example in the form of second stage HPC blades 8 the spanwise lengths SL are about 1.8 inches and the chords C about 1.3 inches long. The offset distance LO from the airfoil base 35 is about 15% of the spanwise length SL and have patch lengths L1 that are about 85% of the spanwise length SL. The patch widths W1 are about 0.2 inches. The patches were formed using laser beams of about 15–25 joules with spots 58 having diameters D of about 0.14 inches or 3.5 mm.

FIG. 4 illustrates an exemplary pattern of stacked rows of overlapping laser shocked peened circular spots 58

(indicated by the circles). All the laser shocked peened circular spots 58 with their corresponding centers X lie along a row centerline 62. A pattern of sequences entirely covers the laser shock peened patch 45. The laser shocked peened circular spots 58 have a diameter D in a row 64 of overlapping laser shock peened circular spots. The pattern has multiple overlapping rows 64 of overlapping shock peened circular spots within the patch 45. A first exemplary overlap, illustrated as about 30%, is between adjacent laser shock peened circular spots 58 in a given row. The overlap is typically defined by a first offset O1 between centers X of the adjacent laser shock peened circular spots 58 and though illustrated as 30% and it can vary from about 30%–50% or more of the diameter D. A second overlap is between adjacent laser shock peened circular spots 58 in adjacent rows and is generally defined by a second offset O2 between adjacent row centerlines 62 and though illustrated as 30% and it can vary from about 30%–50% of the diameter D depending on applications and the strength or fluency of the laser beam. The pattern is referred to as stacked because the centers X of adjacent spots 58 in adjacent rows we all linearly aligned. Other patterns are disclosed in the references, see U.S. Pat. Nos. 5,591,009, 5,674,329, and 5,674,328. One and two hits of the laser beam per spot 58 has been used with the strength or fluency of the laser beam being about 48–50 joules and 40 joules with spots 58 having diameters D of about ¼ inch as illustrated in FIG. 4.

Laser shock peening is being developed for many applications in the gas turbine engine field, some of which are disclosed in the following U.S. Pat. No. 5,756,965 entitled "On The Fly Laser Shock Peening"; U.S. Pat. No. 5,591,009 entitled "Laser shock peened gas turbine engine fan blade edges"; U.S. Pat. No. 5,531,570 entitled "Distortion control for laser shock peened gas turbine engine compressor blade edges"; U.S. Pat. No. 5,492,447 entitled "Laser shock peened rotor components for turbomachinery"; U.S. Pat. No. 5,674,329 entitled "Adhesive tape covered laser shock peening"; and U.S. Pat. No. 5,674,328 entitled "Dry tape covered laser shock peening", all of which are assigned to the present Assignee.

Laser peening has been utilized to create a compressively stressed protective layer at the outer surface of an article which is known to considerably increase the resistance of the article to fatigue failure as disclosed in U.S. Pat. No. 4,937,421 entitled "Laser Peening System and Method". These methods typically employ a curtain of water flowed ever the article or some other method to provide a plasma confining medium. This medium enables the plasma to rapidly achieve shockwave pressures that produce the plastic deformation and associated residual stress patterns that constitute the LSP effect. The curtain of provides a confining medium to confine and redirect the process generated shock waves into the bulk of the material of a component being LSP'D to create the beneficial compressive residual stresses.

The present invention is a method that uses laser shock peened airfoil edges of blades and vanes to extend the service life of the airfoils without using blending or similar techniques as used in the prior art.

Figure 5:
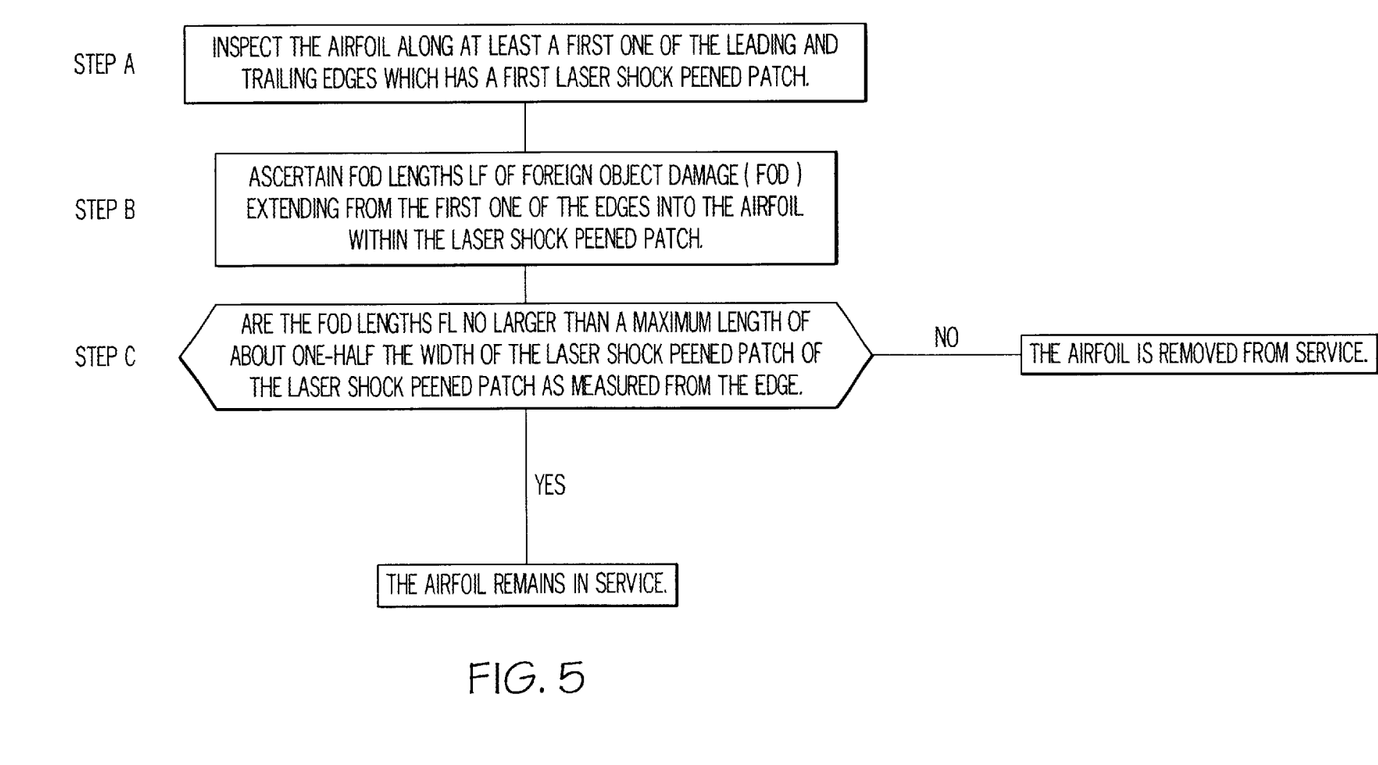
FIG. 5 is a flow chart illustrating a first exemplary method of inspecting and operating a laser shock peened airfoil of the present invention.

A first flow chart in FIG. 5 illustrated a first exemplary method of operating and inspecting the gas turbine engine airfoil having leading and trailing edges, LE and TE respectively, subject to FOD damage. The method is explained herein more particularly for leading edges but applies to trailing edges as well. The method includes the following steps:

A) inspecting the airfoil along at least a first one of the edges, such as the leading edge LE, which has a first laser shock peened patch 45 along the first one of the edges;

B) ascertaining FOD lengths LF (FIG. 2) of foreign object damage (FOD) extending from the first one of the edges into the airfoil 34 within the patch 45; and C) allowing the airfoil to remain in service if the FOD lengths LF are up to a maximum length LM of about one-half the width W1 of the laser shock peened patch 45 of the laser shock peened patch 45 as measured from the edge. If the FOD lengths LF are not larger than the maximum length LM, the airfoil is allowed to remain is service. If the FOD lengths LF are greater than the maximum length LM of about one-half the width W1 of the laser shock peened patch 45 as measured from the edge, the airfoil is removed from service and scrapped or refurbished. In one more particular embodiment, the width W1 of the laser shock peened patch is in a range of about 0.50–1.50 inches. In another embodiment, the airfoil is left in service if the maximum length LM is in a range of about 0.150–0.300 inches. Note that step B), ascertaining FOD lengths LF of foreign object damage (FOD), can be preformed on or off the wing depending on the circumstances and procedures for inspecting the airfoils.

Figure 6:
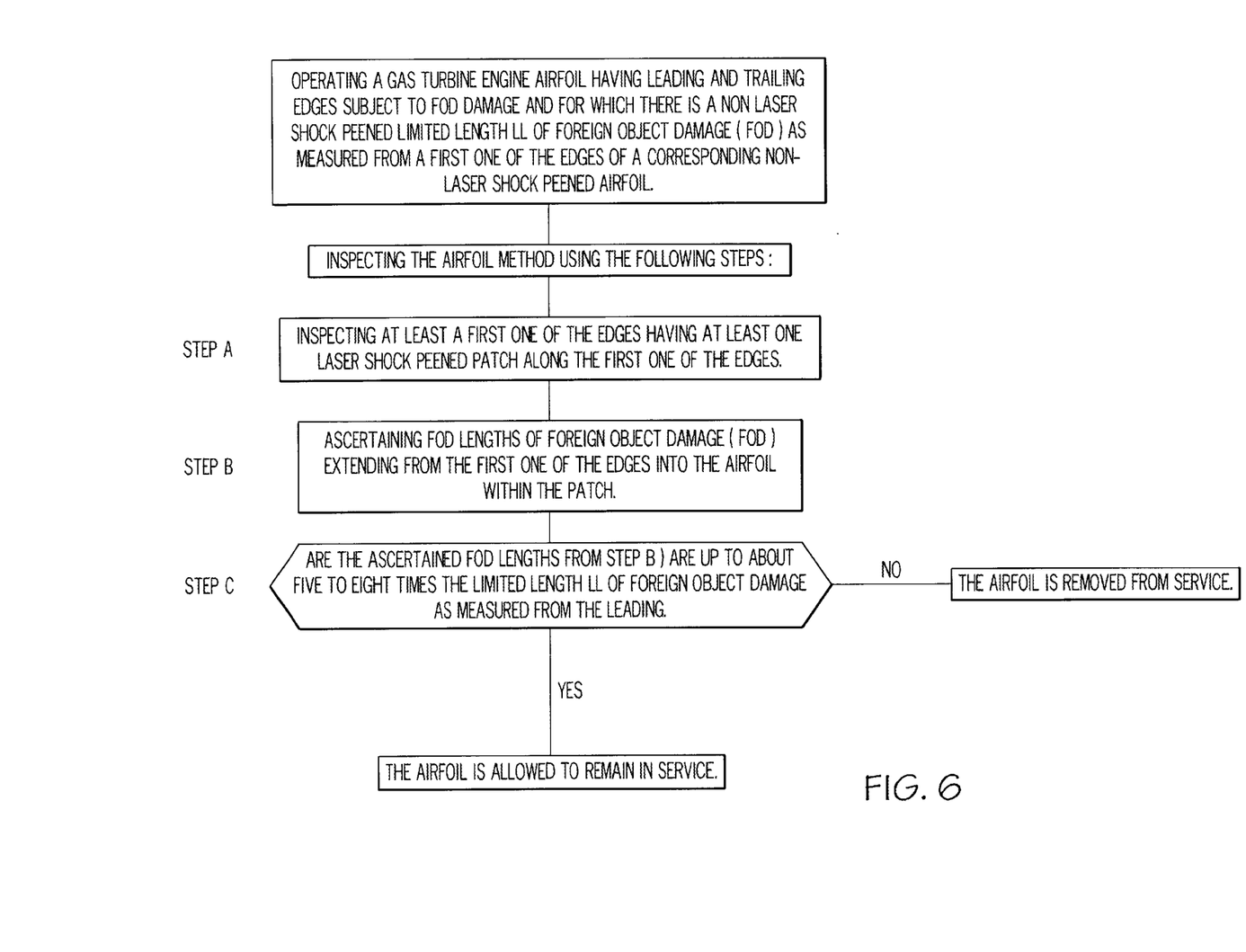
FIG. 6 is a flow chart illustrating a second exemplary method of inspecting and operating a laser shock peened airfoil of the present invention.
Figure 8:
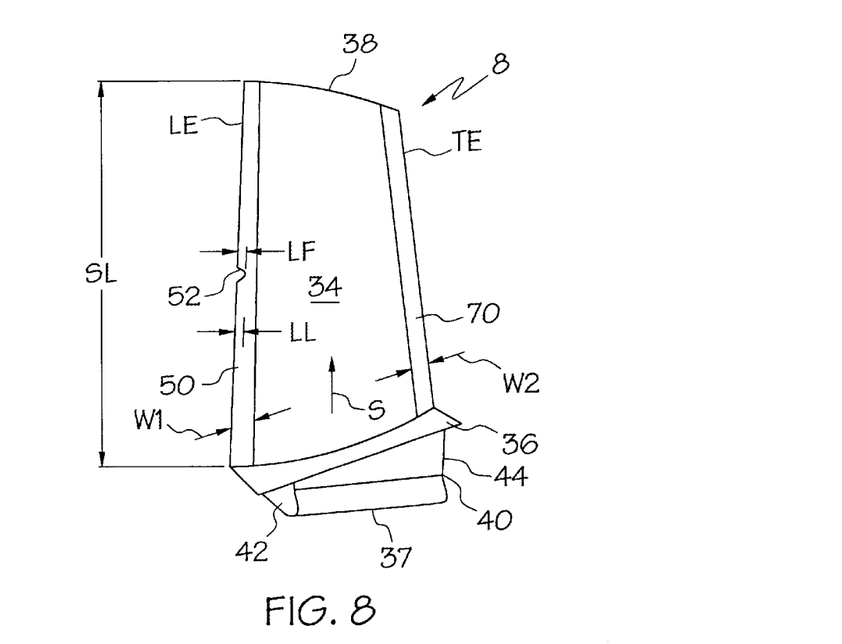
FIG. 8 is a perspective illustrative view of a non-laser shock peened version of the aircraft gas turbine engine fan blade in FIG. 1.

Illustrated in FIG. 6 is a second exemplary method of operating and inspecting the gas turbine engine airfoil having leading and trailing edges subject to FOD damage and for which there is a non-laser shock peened limited length LL in FIG. 8 of foreign object damage (FOD) as measured from a first one of the edges of a corresponding non-laser shock peened airfoil, i.e. an airfoil not having laser shock peened patches on the leading and/or trailing edges. This method includes the following steps: A) inspecting at least a first one of the edges having at least one laser shock peened patch along the first one of the edges, B) ascertaining FOD lengths of foreign object damage (FOD) extending from the first one of the edges into the airfoil within the patch, and C) allowing the airfoil to remain in service if the ascertained FOD lengths from step B) are up to about five to eight times the limited length LL of foreign object damage as measured from the leading edge.

While there have been described herein, what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention.

Accordingly, what is desired to be secured by letters patent of the united states is the invention as defined and differentiated in the following claims:

What is claimed is:

1. A method for operating a gas turbine engine airfoil having leading and trailing edges subject to FOD damage, said method comprising:

inspecting the airfoil along at least a first one of the edges having at least a first laser shock peened patch along the first one of the edges.

ascertaining FOD lengths of foreign object damage (FOD) extending from the first one of the edges into the airfoil within the patch, and allowing the airfoil to remain in service without repair if the FOD lengths are up to a maximum length of about one-half a width of the laser shock peened patch as measured from the edge.

2. A method as claimed in claim 1 wherein the airfoil is a fan blade airfoil and the width of the laser shock peened patch is in a range of about 0.50–1.50 inches.

3. A method as claimed in claim 1 wherein the airfoil is a fan blade airfoil and includes allowing the airfoil to remain in service if the maximum length is in a range of about 0.150–0.300 inches.

4. A method as claimed in claim 1 wherein the airfoil is a compressor blade airfoil and the laser shock peened patch extends about 85% of the spanwise length SL from a tip of the airfoil towards an airfoil base and the width of the laser shock peened patch is in a range of about 0.2–0.25 inches.

5. A method for operating a gas turbine engine airfoil having leading and trailing edges subject to FOD damage and for which there a limited length of foreign object damage (FOD) as measured from a first one of the edges of a corresponding non-laser shock peened airfoil, said method comprising the following steps:
   A) inspecting at least a first one of the edges having at least one laser shock peened patch along the first one of the edges,
   B) ascertaining FOD lengths of foreign object damage (FOD) extending from the first one of the edges into the airfoil within the patch, and
   C) allowing the airfoil to remain in service without repair if the ascertained FOD lengths from step B) are up to about five to eight times the limited length of foreign object damage as measured from the leading edge.

6. A method for operating a gas turbine engine airfoil having a leading edge subject to FOD damage, said method comprising:
   laser shock peening the leading edge and forming pressure and suction side laser shock peened patches on pressure and suction sides respectively of the airfoil along the leading edge wherein the laser shock peened patches extend along substantially an entire spanwise length of the leading edge,
   operating the gas turbine engine airfoil in service,
   inspecting the airfoil,
   ascertaining FOD lengths of foreign object damage (FOD) extending from the leading edge into the patches, and
   allowing the airfoil to remain in service without repair if the FOD lengths are up to about one-half a width of the laser shock peened patches as measured from the leading edge.

7. A method as claimed in claim 6 wherein the laser shock peening includes using dual laser beams fired simultaneously and each of the laser beams having a power in a range of about 40–60 joules and forming a laser beam spot with a diameter of about ¼ inch at a surface of the patch.

8. A method as claimed in claim 6 wherein the laser shock peening includes using dual laser beams fired simultaneously and each of the laser beams having a power of about 50 joules and forming a laser beam spot with a diameter of about ¼ inch at a surface of the patch.

9. A method as claimed in claim 7 wherein the width of the laser shock peened patch is in a range of about 0.50–1.50 inches.

10. A method for operating a gas turbine engine airfoil having a leading edge subject to FOD damage and for which there is a first limit on FOD length of foreign object damage (FOD) as measured from a first one of the edges of a corresponding non-laser shock peened airfoil, said method comprising the following steps:
   A) laser shock peening the leading edge and forming pressure and suction side laser shock peened patches on pressure and suction sides respectively of the airfoil along the leading edge wherein the laser shock peened patches extend along substantially an entire spanwise length of the leading edge,
   B) inspecting at the shock peened patches,
   C) ascertaining FOD lengths of foreign object damage (FOD) within the patches, and
   D) allowing the airfoil to remain in service without repair if the ascertained FOD lengths from step C) are up to about five to eight times the first limit on length of foreign object damage as measured from the edge.

11. A method as claimed in claim 10 wherein the laser shock peening includes using dual laser beams fired simultaneously and each of the laser beams having a power in a range of about 40–60 joules and forming a laser beam spot with a diameter of about ¼ inch at a surface of the patch.

12. A method as claimed in claim 11 wherein the width of the laser shock peened patch is in a range of about 0.50–1.50 inches.

13. A method as claimed in claim 10 wherein the laser shock peening includes using dual laser beams fired simultaneously and each of the laser beams having a power of about 50 joules and forming a laser beam spot with a diameter of about ¼ inch at a surface of the patch.

14. A method for operating a gas turbine engine airfoil having a leading edge subject to FOD damage, said method comprising:
   laser shock peening the leading edge and forming pressure and suction side laser shock peened patches on pressure and suction sides respectively of the airfoil along the leading edge wherein the laser shock peened patches extend along about 85% of the spanwise length SL from a tip of the airfoil towards an airfoil along the leading edge,
   operating the gas turbine engine airfoil in service,
   inspecting the airfoil,
   ascertaining FOD lengths of foreign object damage (FOD) extending from the leading edge into the patches, and
   allowing the airfoil to remain in service without repair if the FOD lengths are up to about one-half a width of the laser shock peened patches as measured from the leading edge.

15. A method as claimed in claim 14 wherein the laser shock peening includes using dual laser beams fired simultaneously and each of the laser beams having a power in a range of about 40–50 joules and forming a laser beam spot with a diameter of about 0.16 inches at a surface of the patch.

16. A method as claimed in claim 14 wherein the laser shock peening includes using dual laser beams fired simultaneously and each of the laser beams having a power in a range of about 15–25 joules and forming a laser beam spot with a diameter of about 0.14 inches at a surface of the patch.

* * * * *